United States Patent
Weill

(10) Patent No.: US 7,362,265 B2
(45) Date of Patent: Apr. 22, 2008

(54) PROCESS FOR ACCURATE LOCATION DETERMINATION IN GPS POSITIONING SYSTEM

(75) Inventor: Lawrence R. Weill, Seal Beach, CA (US)

(73) Assignee: Magellan Systems Japan Inc., Suita-Shi (JP)

( * ) Notice: Subject to any disclaimer, the term of this patent is extended or adjusted under 35 U.S.C. 154(b) by 400 days.

(21) Appl. No.: 11/103,499

(22) Filed: Apr. 12, 2005

(65) Prior Publication Data

US 2007/0171124 A1    Jul. 26, 2007

(51) Int. Cl.
*G01S 1/00* (2006.01)

(52) U.S. Cl. .................. 342/357.06; 342/357.09; 342/357.12

(58) Field of Classification Search .......... 342/357.02, 342/357.04, 357.05, 357.06, 357.12, 357.09; 701/213, 215
See application file for complete search history.

(56) References Cited

U.S. PATENT DOCUMENTS

| | | | |
|---|---|---|---|
| 5,535,278 A * | 7/1996 | Cahn et al. | 380/274 |
| 2003/0054759 A1* | 3/2003 | Da et al. | 455/7 |
| 2005/0192024 A1* | 9/2005 | Sheynblat | 455/456.1 |

\* cited by examiner

*Primary Examiner*—Dao Phan
(74) *Attorney, Agent, or Firm*—Kratz, Quintos & Hanson, LLP.

(57) ABSTRACT

A base station (server) transmits assisting information to the user's receiver (rover). Signals from at least 5 satellites are used for 3-dimensional positioning. Pseudorange measurements are made in a system of equations having a minimum set of unknowns X,Y,Z, and T. (X,Y,Z) is the 3D rover position in a predefined coordinate system, and T is the time at which simultaneous measurements are made to determine pseudoranges to all satellites. The position of each satellite is a vector-valued function $f_k$ (T) of said time T, where $f_k$ is determined from satellite ephemeris data or its equivalent, sent to the rover over a communication link, as well as from knowledge of the approximate position of the rover.

5 Claims, 3 Drawing Sheets

PROCESS FOR ACCURATE LOCATION DETERMINATION IN GPS POSITIONING SYSTEM

BACKGROUND OF INVENTION

Satellite positioning systems, such as the Global Positioning System (GPS) or its European counterpart, Galileo, can determine the position of the user anywhere on Earth with accuracies that range from tens of meters using autonomous low-cost receivers to the centimeter level using survey-grade receivers which operate in conjunction with a base station (differential operation). In both of these modes of operation, the receiver must acquire and track the signals from a plurality of satellites in order to make measurements of the distance from the receiver to each of the satellites in view. The ability of the receiver to perform these tasks is often limited by the presence of buildings, mountains, foliage, or other obstacles that block or severely attenuate the received satellite signals. In addition, a considerable length of time may be required to search for and acquire the satellite signals, read the navigational data contained in them, and make the measurements needed to establish the position of the user.

These limitations are particularly serious when the user needs to establish his or her position in an emergency situation. In a typical emergency the user needs immediate assistance from other parties, such as paramedics, police officers, or firemen, who need accurate information as to the location of the emergency. Time is of the essence in these situations (for example, a heart attack). Standard satellite navigational receivers usually take too much time to perform the operations needed to obtain a position of the user, which might be as much as several minutes or more. Additionally, it is often the case that the satellite signals at the location of the emergency are too weak to be usable by a standalone receiver. This is not at all uncommon inside a building whose walls severely attenuate the electromagnetic radiation from the satellites.

In recent years considerable effort has been made to overcome the limitations of weak signal reception and to significantly reduce the time from receiver turn-on to the determination of user position (time to first fix), so that quick and reliable emergency location becomes possible. The primary method for achieving this goal is to use what is known as assisted positioning, in which a base station (the server), located in a good satellite signal reception location, collects data from the satellites and transmits it and other data to the user (the rover) via an independent communication link between server and rover.

To simplify and make more concrete the background of the present invention, as well as the description of the present invention itself, it is assumed from this point on that the positioning system uses GPS satellites. However, it is to be understood that the concepts would also apply to other satellite positioning systems.

Principles of Unassisted Positioning

In order to best understand the principles of assisted positioning, a review of standard non-assisted GPS positioning is helpful. When a typical stand-alone GPS receiver is first turned on, a sequence of operations must ensue before information in the GPS satellite signals can be and used to provide a position fix. In the order of execution, these operations are as follows:

1. Use stored almanac data to determine which satellites are visible to the antenna.

2. Determine the approximate Doppler of each visible satellite.

3. Search for each satellite signal both in frequency and C/A code phase.

4. Detect the presence of each signal and confirm the detection.

5. Lock onto and track the C/A code from each satellite.

6. Lock onto and track the carrier phase from each satellite.

7. Perform navigation data bit synchronization.

8. Demodulate the navigation data bit stream to obtain ephemeris and time information.

9. Measure the time of arrival of a specific identifiable point of each satellite signal received waveform according to the receiver clock.

10. Use the time information in Step 8 to determine the GPS time of transmission of the same point on the waveform described in Step 9.

11. Compute the pseudorange to each satellite by subtracting the GPS time of transmission (Step 10) from the time of arrival (Step 9) and multiplying this difference by the speed of light.

12. Use the ephemeris data for each satellite (Step 8) to determine the position of the satellite at the GPS time of transmission (Step 10).

13. Use the pseudorange to each satellite (Step 11) and the satellite positions (Step 12) to compute the position of the user's receiver and very accurate time.

In a standard GPS receiver the above sequence of operations can be quite time consuming; In particular, the search for satellites in Step 3 may require several minutes or even more, depending on a number of conditions. At the start of the search the Doppler shift of the signal from each satellite may not be accurately known, so time must be taken to explore a window of frequencies in order to find a signal. This window must be wide enough to encompass the frequency uncertainty of the signal. Before the first satellite is acquired, a major source of this uncertainty is the frequency uncertainty in the reference oscillator of the user's receiver, which might be on the order of 1 part per million, or ±1575 Hz at the GPS $L_1$ carrier frequency of 1575.42 MHz. A second source of frequency uncertainty occurs when the receiver does not have recent (no more than 2 hours old) ephemeris data, or does not have sufficiently accurate approximate a-priori knowledge of its position to know what signal Doppler shift to expect (the Doppler shift can change by approximately 1 Hz/km worst case).

The average search time in order to acquire a sufficient number of satellite signals for positioning can further be lengthened if the signals are weak, as is commonly the case when the receiver is inside a building or surrounded by obstructions which block the signals. Weak signals must be averaged over a longer time interval in order to raise them far enough above the noise level to be reliably detected. Thus, the average search time in Step 3 above can be significantly longer than for unobstructed signals.

In addition to the possibility of a lengthy search to acquire the satellites, the demodulation of the navigation data stream from each satellite to obtain ephemeris and time information in Step 8 also can take a considerable length of time. Ephemeris data from each satellite is used to determine the position of that satellite at the time of signal transmission obtained in Step 10. The ephemeris data is basically a formula, or more accurately, a parameterized algorithm, into which the transmission time can be substituted in order to calculate the satellite position at that time. In standard (non-assisted) GPS positioning, the ephemeris data is obtained from the 50 bit/second GPS navigation data received directly from the satellite by the user. The navigation data stream consists of sequentially transmitted 1500-bit frames of duration 30 seconds (1500 bits÷50 bits/sec), each of which contains five 300-bit subframes. The first three subframes consist of time and ephemeris data. The ephemeris data is repeated at the frame repetition rate, except for occasional updates. Thus, the reception of a complete sample of ephemeris data from a single satellite may take as long as 30 seconds, depending on when the user's receiver begins to look for such data within a received frame.

A more serious problem in extracting the time and ephemeris data from the navigation message occurs when the GPS signal is too weak to permit reliable demodulation of the navigation message data bits. This problem manifests itself at a C/No of approximately 25 dB-Hz. In urban canyons and inside buildings the C/No can easily fall below this value, rendering the user's standard GPS receiver inoperative because it can no longer obtain error-free ephemeris and time data needed for positioning.

Principles of Assisted Positioning

The above limitations of standard positioning methods can be overcome by using assisted positioning. In assisted positioning, a base station (the server) sends information to the user's receiver (the rover). Although this information may vary somewhat for different assisted systems, typical information is as follows:

1. The server can send a very accurate frequency reference to the rover, which is used to calibrate the reference oscillator in the rover receiver. The carrier frequency of the server-rover communication link is often used for this purpose. Once the frequency uncertainty of the rover's reference oscillator has been removed, the time required for the acquisition of the first satellite by the rover receiver is considerably reduced because the width of the search frequency window can be made much smaller.

2. In many cases the server can determine the approximate location of the rover relative to the server. For example, if the rover receiver is embedded in a cellular telephone (a common practice in an emergency location system), the location of the cellular tower that receives the strongest cell phone signal will serve this purpose. Knowledge of the approximate location of the rover, in conjunction with ephemeris data collected by the server, further narrows down the frequency uncertainty in searching for satellite signals. Additionally, if the server can determine the rover's approximate location to within approximately 100-200 km, the rover does not need to extract the highly accurate time information from the satellites' navigation data message (Step 10 above), which normally would be necessary in order to determine pseudorange.

3. Ephemeris and satellite clock correction data from each satellite can be collected by the server and transmitted to the rover. This is very advantageous, because the rover does not have to spend precious time (at least 30 seconds) to receive the data directly from the satellites. Because the server is located in clear view of the satellites, the satellite signals will be strong enough at that location to reliably demodulate the ephemeris data. The server can then easily transmit the data to the rover at a data rate much higher than the GPS 50 ps rate, and with a power high enough to penetrate into areas where the rover would otherwise not be able to receive the ephemeris data directly from the satellites.

4. In some assisted positioning systems, the server sends to the rover a copy of the actual navigation data bit stream received from the satellites. Knowledge of the bit pattern permits the rover to reliably strip the data modulation from the satellite signals it is receiving, thus permitting much longer coherent integration times in the process of measuring time of arrival of the satellite signals (Step 9 above). The resulting processing gain permits signals to be used for this purpose that would otherwise be too weak to be of any value.

5. The server can also transmit accurate timing information to the rover. Timing information from the server is essential if the rover cannot directly recover unambiguous time from the GPS navigation message due to signal blockage or attenuation.

The Role of Timing Information in Assisted Positioning

As previously discussed, in standard unassisted positioning accurate time must be directly recovered from the GPS signals for two purposes: to accurately determine times of signal transmission (Step 10 above) for the purpose of (1) measuring pseudoranges, and (2) to locate the position of each satellite at that time. For the purpose of determining pseudoranges, the time must be accurate to within tens of nanoseconds to prevent excessive ranging errors due to the speed of propagation of light. For the purpose of establishing the positions of the satellites, the time of transmission is inserted into the ephemeris equations received from the satellite. Here the required accuracy of time is less stringent. The satellites have a tangential orbital velocity of approximately 3800 m/sec, so for the purpose of determining satellite position, time must be accurate to a few milliseconds in order to keep satellite position errors within a few tens of meters.

However, in most assisted positioning systems accurate time must be obtained from a source other than the GPS signal itself, for two reasons. First, it is not desirable for the rover to spend precious time reading the time information from the received signal, and second, the signal may be too weak to permit this to occur. Therefore, in typical assisted positioning systems, a timing signal is sent from the server to the rover. Such a timing signal cannot be used to determine time of signal transmission from the satellite, since the time of signal transmission differs from absolute time at the server or the rover by an unknown amount (even if the timing signal could be used for this purpose it would be difficult or impossible for a communication link to provide it to the rover at the required accuracy of tens of nanoseconds).

Fortunately, it is possible for the rover to know an ambiguous form of signal transmission time from a GPS satellite without demodulating the navigation data message. This is possible because the epochs of the GPS C/A code are transmitted by each satellite precisely at each whole millisecond of satellite vehicle (SV) time, which differs from GPS time by an error term contained in the navigation message available at the server and transmitted to the rover (GPS time is a precise time to which all satellites are synchronized). The rover's receiver can identify the code epochs by correlating the received signal with a replica of the C/A code. This can be done reliably even with weak signals, because correlating over long periods of time can provide large amounts of processing gain. However, the transmission times of the epochs have a 1 millisecond ambiguity, i.e., it is only known that a specific epoch was transmitted at a SV time equal to an integer number of milliseconds, but the value of the integer is unknown. Thus, the pseudoranges to each satellite are subject to the same ambiguity, which in space is approximately 300 km. When these ambiguous times are used in the positioning equations, the solution of the equations results in a three-dimensional lattice, or grid, of possible rover positions with a spacing on the order of 300 km (the actual spacing will deviate from this value due to satellite-receiver geometry). However, if the rover's approximate position is known within approximately 100-200 km, the position ambiguity can be resolved. However, the 1-millisecond time ambiguity remains unresolved.

Thus, an unambiguous timing signal from the server is required only for the purpose of establishing the satellite positions at their transmission times, and therefore only needs to be accurate to within several milliseconds to keep the satellite position error acceptably small. Unfortunately, however, the communication link, such as a cell phone link typically available for this purpose, contains unknown and variable transmission delays occur due to packetizing and queuing of data from the server. These unpredictable delays often are much too large to be of use for determining satellite positions. On the other hand, it would desirable to use existing server-to-rover communication links, even if they are not originally designed for transmission of accurate timing signals. However, the modification of such a communication link (for example, a cellular telephone network) to provide a sufficiently accurate timing signal is undesirable because it can be far too costly and is generally not appealing to providers of such services. Therefore, an alternative solution to the problem is needed.

DETAILED DESCRIPTION OF THE PRESENT INVENTION

Figure 1:
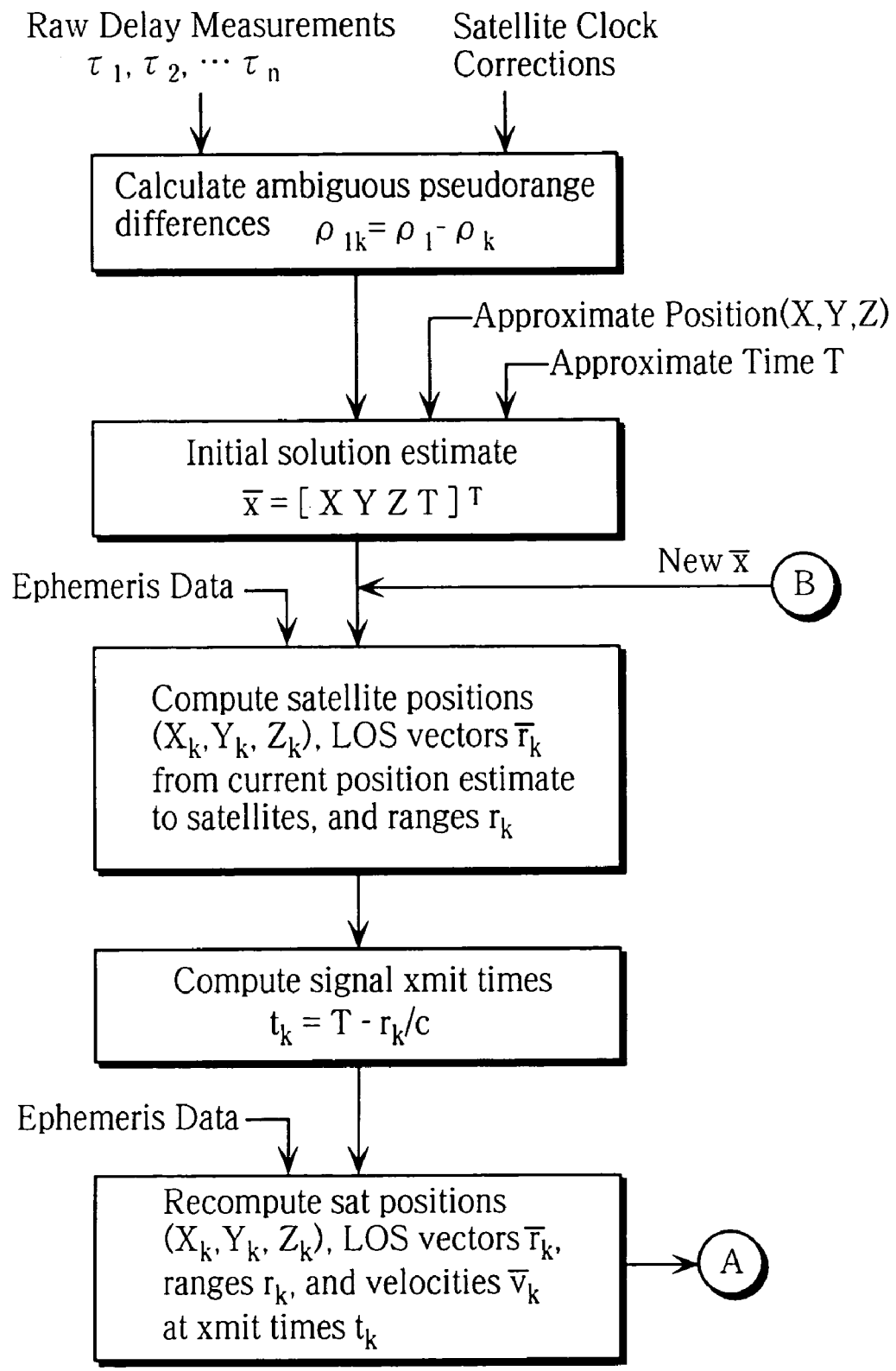
FIG. 1 is a flowchart of a principal portion showing an embodiment of the present invention.

The present invention solves the problem of obtaining unambiguous time, with an error generally not exceeding several milliseconds, by using at least one additional satellite beyond what is normally needed for positioning. The rover obtains time neither from the navigation message nor from the server. Instead, time is treated as an additional variable which can be determined directly from the navigation solution, although not as accurately as that based on timing data contained in the navigation message. Navigation solutions in unassisted receivers generally solve for position (three coordinates X, Y, and Z) and receiver clock error B. In such receivers the solution for receiver clock error B can be used to calibrate the receiver clock and thereby obtain very accurate time, but to get this degree of accuracy the navigation solution requires that the receiver read timing data directly from the GPS signal. In contrast, the present invention includes unambiguous time t as the fourth variable, and timing data need not be read from the GPS signal itself. This new variable is unrelated to the receiver clock error B, which is no longer a variable in the navigation solution of the present invention. For three-dimensional positioning the present invention requires a minimum of five satellites, and for two-dimensional positioning, where altitude is known a-priori or an altitude map is available, four satellites will suffice. The requirement for at least one additional satellite is not as disadvantageous as might be thought, because additional satellites from other positioning systems, such as Glonass, will likely have sufficient signal strength to be usable, and in the future even more satellites will become available from systems such as Galileo and possibly others as well.

The typical error-free model for pseudorange measurements made by a conventional GPS unassisted or assisted receiver using the current art is $$\bar{\rho} = f(X, Y, Z, B), \quad (1)$$

where $\bar{\rho} = [\rho_1 \ \rho_2 \ \ldots \ \rho_n]^T$ is the vector of pseudorange measurements from the n observed satellites, (X, Y, Z) is the receiver position, B is the receiver clock bias, and $f$ is a known function. The goal of positioning is to determine the navigation solution $\bar{x} = [X \ Y \ Z \ B]^T$, given the measurements $\bar{\rho}$. The function $f$ is defined by the following system of equations:

$$\rho_1 = \sqrt{(x_1-X)^2 + (y_1-Y)^2 + (z_1-Z)^2} + B$$

$$\rho_2 = \sqrt{(x_2-X)^2 + (y_2-Y)^2 + (z_2-Z)^2} + B \quad (2)$$

$$\rho_n = \sqrt{(x_n-X)^2 + (y_n-Y)^2 + (z_n-Z)^2} + b$$

where the position of the $k^{th}$ satellite at its time of transmission is $(x_k, y_k, z_k)$ and the pseudorange measurement for that satellite is $\rho_k$. It is assumed that B is in seconds and the satellite and server positions are expressed in meters using a local East-North-Up (ENU) coordinate system in which the East-North plane is tangent to the Earth's surface, so that Z and $z_k$ respectively denote the altitudes of the rover and the $k^{th}$ satellite above a datum representing the Earth's surface. However, other coordinate systems can be used.

In this model the satellite positions are determined by entering the proper times of signal transmission into the equations of satellite motion provided by the ephemeris data. In a conventional unassisted GPS receiver the ephemeris data is available from the navigation message, and in an assisted GPS system the ephemeris data (or its equivalent), is generally sent from the server to the rover.

In a conventional unassisted GPS receiver designed for unobstructed signals, time of signal transmission for the purpose of locating satellites is readily determined from timing information in the received navigation message. However, in an assisted GPS system it is undesirable to use up valuable time for the rover to read the timing data. Moreover, the signals are often too weak to read such data. Current art in assisted GPS positioning typically solves this problem in one of two ways, assuming that the server has an accurate clock: 1. The rover can obtain time from synchronizing signals sent by the server, and then use ephemeris data to compute satellite positions corresponding to the time at which pseudorange measurements are made. 2. The rover can send a timing pulse to the server at the instant of pseudorange measurements, and the server can then return to the rover numerical data indicating the time of receipt of the pulse.

However, such timing coordination imposes requirements on the server and its communication network which are often costly and difficult to implement. The present invention is an alternate solution that uses at least one extra satellite beyond the usual minimum needed for positioning. This permits the time of pseudorange measurement, hence the corresponding satellite positions, to be part of the navigation solution, and accurate timing data received directly from the satellites or from the server is not needed.

The present invention uses a different system of equations in which the receiver clock bias B is no longer a variable of interest. In fact, this bias will no longer be determinable to the high level of accuracy (approximately 10-100 nanoseconds) that is achievable using a conventional unassisted receiver that obtains time directly from the GPS signals. In developing the new equations, the first step is to eliminate B as a variable in the system (2) by subtracting from the first equation each of the remaining equations. The result is the system $$\rho_{12} = \sqrt{(x_1-X)^2+(y_1-Y)^2+(z_1-Z)^2} - \sqrt{(x_2-X)^2+(y_2-Y)^2+(z_2-Z)^2}$$

$$\rho_{13} = \sqrt{(x_1-X)^2+(y_1-Y)^2+(z_1-Z)^2} - \sqrt{(x_3-X)^2+(y_3-Y)^2+(z_3-Z)^2} \quad (3)$$

$$\rho_{1n} = \sqrt{(x_1-X)^2+(y_1-Y)^2+(z_1-Z)^2} - \sqrt{(x_1-X)^2+(y_n-Y)^2+(z_n-Z)^2}$$

where $\rho_{1k} = \rho_1 - \rho_k$. In this system the satellite positions $(x_k, y_k, z_k)$ are represented as functions of the a new time variable T, which is defined as the time of simultaneously making range measurements to each of the n satellites:

$$(x_k, y_k, z_k) = f_k(T) \; k=1, 2, \ldots, n \quad (4)$$

where the function $f_k$ is evaluated by inserting T minus the estimated signal propagation time into the ephemeris equation for the $k^{th}$ satellite (this will be explained in more detail later). The system (3), where the satellite positions are the functions of T given by (4), now has the more compact form $$\overline{d\rho} = g(X, Y, Z, T) = g(\overline{x}) \quad (5)$$

where $\overline{d\rho} = [\rho_{12} \; \rho_{13} \; \ldots \; \rho_{1n}]^T$ is the column vector of measured pseudorange differences between the first satellite and the remaining satellites, and $\overline{x} = [X \; Y \; Z \; T]^T$ is the column vector of unknowns.

Pseudorange Difference Measurements

The pseudorange difference measurements $\rho_{1k}$ made by the rover are obtained by first measuring the pseudorange $\rho_k$, k=1, 2, . . . , n to each satellite. For each satellite this is achieved by correlating the received signal at baseband with a replica of the C/A code for that satellite, and locating the peak of the correlation function. The locations of the peaks determines the phases $\tau_k$ of the satellites' C/A codes at some common reference time $T_0$ according to a clock in the receiver. These phases are recorded. Since the C/A code has a period of 1 millisecond, the recorded phases, in units of milliseconds, each have a range from 0 to 1, and indicate how far into the code period the reference time $T_0$ is located.

For each satellite it is known that the beginning (epoch) of the received code period in which $T_0$ occurs was transmitted by the satellite at a time, which is an integral number $n_k$ of milliseconds according to a clock in the satellite. This clock produces what is known as space vehicle (SV) time. A small time correction $\epsilon_k$, which is part of the navigation data message sent from the server to the rover, is applied to SV time to convert to GPS time, a time, which is identical in all satellites. Thus, for the $k^{th}$ satellite the GPS time of transmission $t_k$, in milliseconds, of the observed point on the received signal having phase $\tau_k$ milliseconds can be written as $$t_k = n_k + \epsilon_k + \tau_k \quad (6)$$

where $n_k$ is an unknown positive integer. The pseudorange $\rho_k$ to the $k^{th}$ satellite is the propagation time from the satellite to the rover receiver multiplied by the speed of light c:

$$\rho_k = c(T_0 - t_k) = c(T_0 - n_k - \epsilon_k - \tau_k) \quad (7)$$

The term pseudorange rather than range is used here because the clock in the rover generally is not be synchronized with GPS time, and therefore has a relative error, or bias, which was previously denoted by B.

In the preferred embodiment of the present invention the measurements of the code phases $\tau_k$ are used to form the pseudorange differences $\rho_{1k}$ as follows:

$$\begin{aligned}\rho_{1k} &= \rho_1 - \rho_k \\ &= c(T_0 - t_1) - c(T_0 - t_k) \\ &= c(t_k - t_1) \\ &= c(n_k + \epsilon_k + \tau_k) - c(n_1 + \epsilon_1 + \tau_1) \\ &= c(n_k - n_1) + c(\epsilon_k - \epsilon_1) + c(\tau_k - \tau_1)\end{aligned} \quad (8)$$

Since $T_0$ is cancelled in forming the pseudorange differences, the receiver clock bias B is also cancelled, and therefore the pseudorange differences could properly be called measured range differences.

The pseudorange differences in (8) suffer an ambiguity because the integers $n_k - n_1$ are not initially known. However, the ambiguity can be resolved if the position of the rover is known to within 100-200 kilometers and the initial estimate of the time of measuring the code phases $\tau_k$ is accurate to within 10 seconds or so. Ambiguity resolution is achieved by first estimating the ranges $r_k$ from the rover to the satellites from knowledge of the approximate rover position and the positions of the satellites at the approximate time (within 10 seconds or so) that the pseudorange measurements are made. The estimated range differences $r_1 - r_k$ are then substituted into (8) in place of the actual pseudorange difference measurements $\rho_{1k}$, and the integers $n_k - n_1$ are computed as $$n_k - n_1 = \text{cint}\left[\frac{r_1 - r_k}{c} - (\tau_k - \tau_1) - (\epsilon_k - \epsilon_1)\right], \quad (9)$$

where cint is the closest integer function, and c is the speed of light in meters per millisecond ($2.9979 \times 10^5$).

Solution of the Navigation Equations

The solution of the navigation equations is a solution for the four variables X, Y, Z, and T. The solution for the time T of range difference measurements is usually expressed in seconds, and the solution (X, Y, Z) for rover position is typically expressed in meters using a local ENU (East-North-Up) coordinate system in which the East-North plane is tangent to the Earth's surface.

There is a subtle but important distinction between the system of equations (1) for current art assisted receivers and the system (5) for the present invention. In the system (1) the unambiguous time of signal transmission from each satellite is known, because sufficiently accurate timing information is available from the server. Hence the position of each satellite at the time of transmission is obtained by inserting that time into the ephemeris data. On the other hand, in the present invention the time of signal transmission can be derived from the solution of the system (4), and timing information from the server is not required.

Note that in (3) the use of five satellites results in four equations in the four unknowns X, Y, Z, and T. Using the compact notation of (5), we wish to solve for $\bar{x}$ in terms of the measurements $\overline{dp}$. Since there may be more measurements than the number of unknowns in $\bar{x}$, a least-squares solution is appropriate. The least squares solution find the solution vector $\bar{x}$ which minimizes $$\|\overline{dp}-g(\bar{x})\|^2. \tag{10}$$

Although g is a nonlinear function, Newton's method can provide a rapidly converging solution. For any vector $\bar{x}$ reasonably close to the true solution, the relationship between a small change $\Delta\bar{x}$ in $\bar{x}$ and the corresponding change $\Delta\overline{dp}$ in the vector $\overline{dp}$ of pseudorange difference measurements is given by $$\Delta\overline{dp}=H\,\Delta\bar{x} \tag{11}$$

where $$H = \begin{bmatrix} \frac{\partial \rho_{12}}{\partial X} & \frac{\partial \rho_{12}}{\partial Y} & \frac{\partial \rho_{12}}{\partial Z} & \frac{\partial \rho_{12}}{\partial T} \\ \frac{\partial \rho_{13}}{\partial X} & \frac{\partial \rho_{13}}{\partial Y} & \frac{\partial \rho_{13}}{\partial Z} & \frac{\partial \rho_{13}}{\partial T} \\ \vdots & \vdots & \vdots & \vdots \\ \frac{\partial \rho_{1n}}{\partial X} & \frac{\partial \rho_{1n}}{\partial Y} & \frac{\partial \rho_{1n}}{\partial Z} & \frac{\partial \rho_{1n}}{\partial T} \end{bmatrix} \tag{12}$$

$$= \begin{bmatrix} \bar{u}_2 - \bar{u}_1 & \bar{u}_1 \square \bar{v}_1 - \bar{u}_2 \square \bar{v}_2 \\ \bar{u}_3 - \bar{u}_1 & \bar{u}_1 \square \bar{v}_1 - \bar{u}_3 \square \bar{v}_3 \\ \vdots & \vdots \\ \bar{u}_n - \bar{u}_1 & \bar{u}_1 \square \bar{v}_1 - \bar{u}_n \square \bar{v}_n \end{bmatrix}$$

In (12) the vectors $$\bar{u}_k = \begin{bmatrix} \frac{\partial r_k}{\partial X} & \frac{\partial r_k}{\partial Y} & \frac{\partial r_k}{\partial Z} \end{bmatrix}$$

are the rover-to-satellite unit vectors along the line of sight (LOS), and the vectors $\bar{v}_k$ are the satellite velocity vectors at time $t_k$.

The matrix H will always have full column rank (=4), and the number of rows will always be one less than the number of satellites. If more than 5 satellites are used, H will have more rows than columns. In such a case a solution for $\Delta\bar{x}$ may not exist. However, the least squares solution for $\Delta\bar{x}$ will exist, and is given by the well-known formula $$\Delta\bar{x}=(H^T H)^{-1} H^T \Delta\overline{dp}. \tag{13}$$

Figure 2:
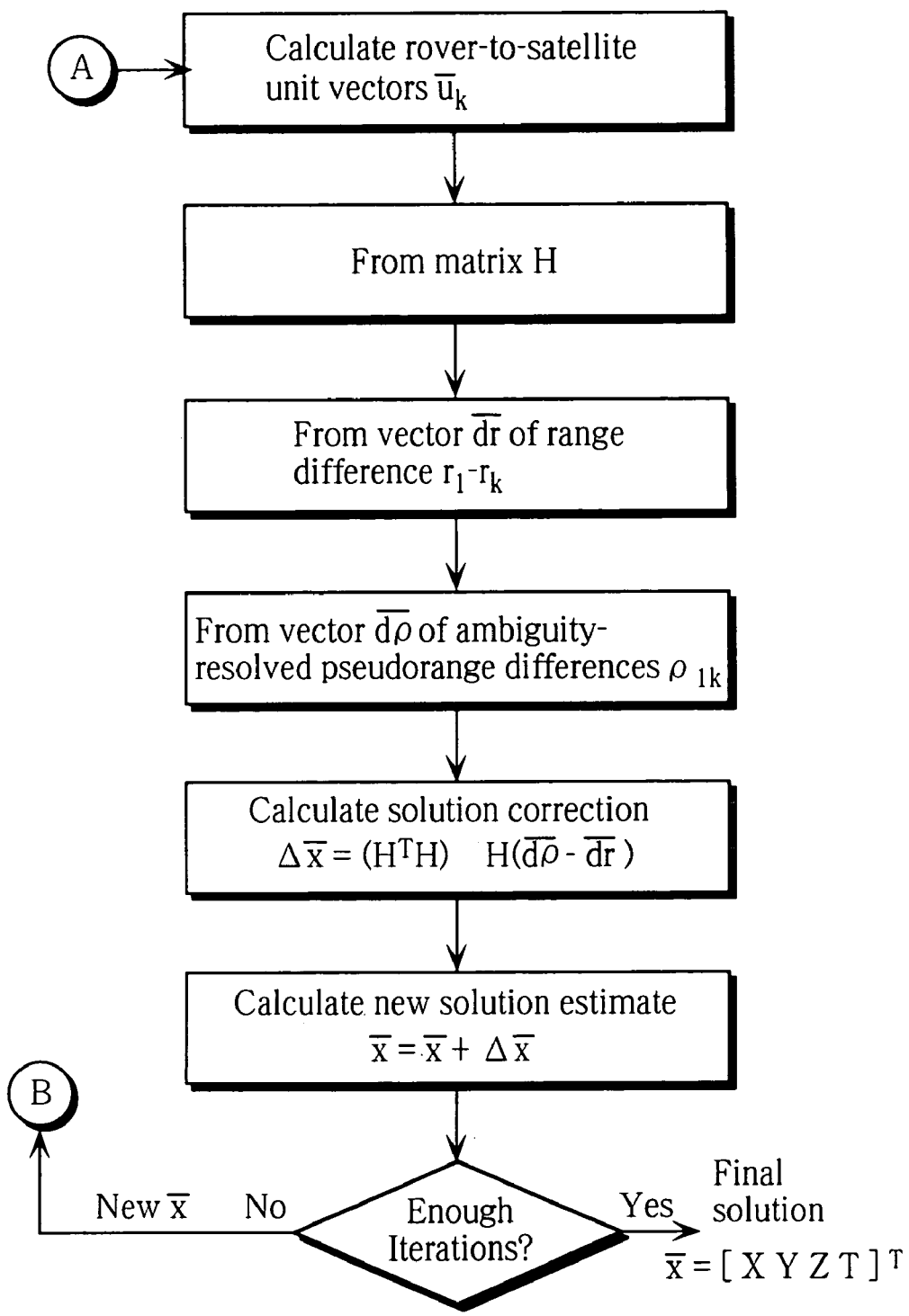
FIG. 2 is a flowchart of another principal portion showing the embodiment of the present invention.

Referring now to FIGS. 1 and 2, the least-squares solution for $\bar{x}$ (not $\Delta\bar{x}$) is found by the following iterative procedure. The looping index is j. The first pass through the loop starts with the an initial solution estimate $\bar{x}=[X\ Y\ Z\ T]^T$ obtained from knowledge of approximate rover position and time, and refines this solution to provide a better solution estimate. Subsequent passes start with the most current estimate and further refine it. In the steps below the index k runs from 1 to the number n of observed satellites:

A. Use the ephemeris data received from the server, or its equivalent, to calculate the satellite positions $(x_k, y_k, z_k)$ at time T.

B. Compute the LOS vectors $\bar{r}_k$ and their lengths (ranges) $r_k$ from the rover position estimate (X, Y, Z) to each satellite.

C. Compute the times of signal transmission $t_k = T - r_k/c$ for the satellites, where c is the speed of light.

D. Use the ephemeris data to recompute the satellite positions $(x_k, y_k, z_k)$, the $\bar{r}_k$ and $r_k$, and the corresponding satellite velocity vectors $\bar{v}_k$, using the times $t_k$ of signal transmission for each satellite that were obtained in Step C.

E. Calculate the rover-to-satellite unit vectors $$\bar{u}_k = \begin{bmatrix} \frac{\partial r_k}{\partial X} & \frac{\partial r_k}{\partial Y} & \frac{\partial r_k}{\partial Z} \end{bmatrix}$$

along the LOS vectors $\bar{r}_k$.

F. Form the matrix H defined in expression (12).

G. Using the $r_k$ previously obtained in Step D, calculate the vector $\overline{dr}=[r_1-r_2\ r_1-r_3, \ldots r_1-r_n]^T$ of range differences that would result using the current solution estimate $\bar{x}$.

H. Calculate the vector $\Delta\overline{dp}=\overline{dp}-\overline{dr}$ of change between the vector of measured pseudorange differences provided by the receiver and the corresponding calculated range differences from Step G. The measured pseudorange differences are calculated according to (8) above, and use satellite clock correction data provided by the server.

I. Calculate the correction $\Delta\bar{x}=(H^T H)^{-1} H\Delta\overline{dp}$ to be applied to the current solution estimate.

J. Generate a new solution estimate $\bar{x}=\bar{x}+\Delta\bar{x}$ (the equals sign symbolizes an arithmetic assignment statement, not an algebraic equality).

K. If not enough iterations have been performed to get good convergence, go to Step A; otherwise exit the iterative process with the solution $\bar{x}$.

This iterative scheme generally converges very rapidly if the initial position estimate (X, Y, Z) is good to within 100-200 kilometers of the actual rover position, and the initial time estimate T is good to within approximately 10 seconds of GPS time. Under these conditions, no more than 5 iterations will generally be required when the satellites used have a position dilution of precision (PDOP) less than 40. Consequently, the loop can simply be executed 5 times, thus avoiding the need for a stopping criterion.

Steps A through K are readily modified to obtain 2D positioning when the rover altitude is known. With a local ENU coordinate system, Z would be the known altitude coordinate.

Because the initial time estimate T need only be accurate to within approximately 10 seconds, it is easily provided by a low-cost real-time clock in the rover (or by a time tick transmitted from the server having a time latency uncertainty that can be as large as approximately 10 seconds). Consequently, the present invention has the advantage that no time synchronization of any kind is required from the server. Thus, assisted positioning is possible using various existing communication links, such as the Internet, to transmit aiding information without modification to permit accurate time transfer.

Figure 3:
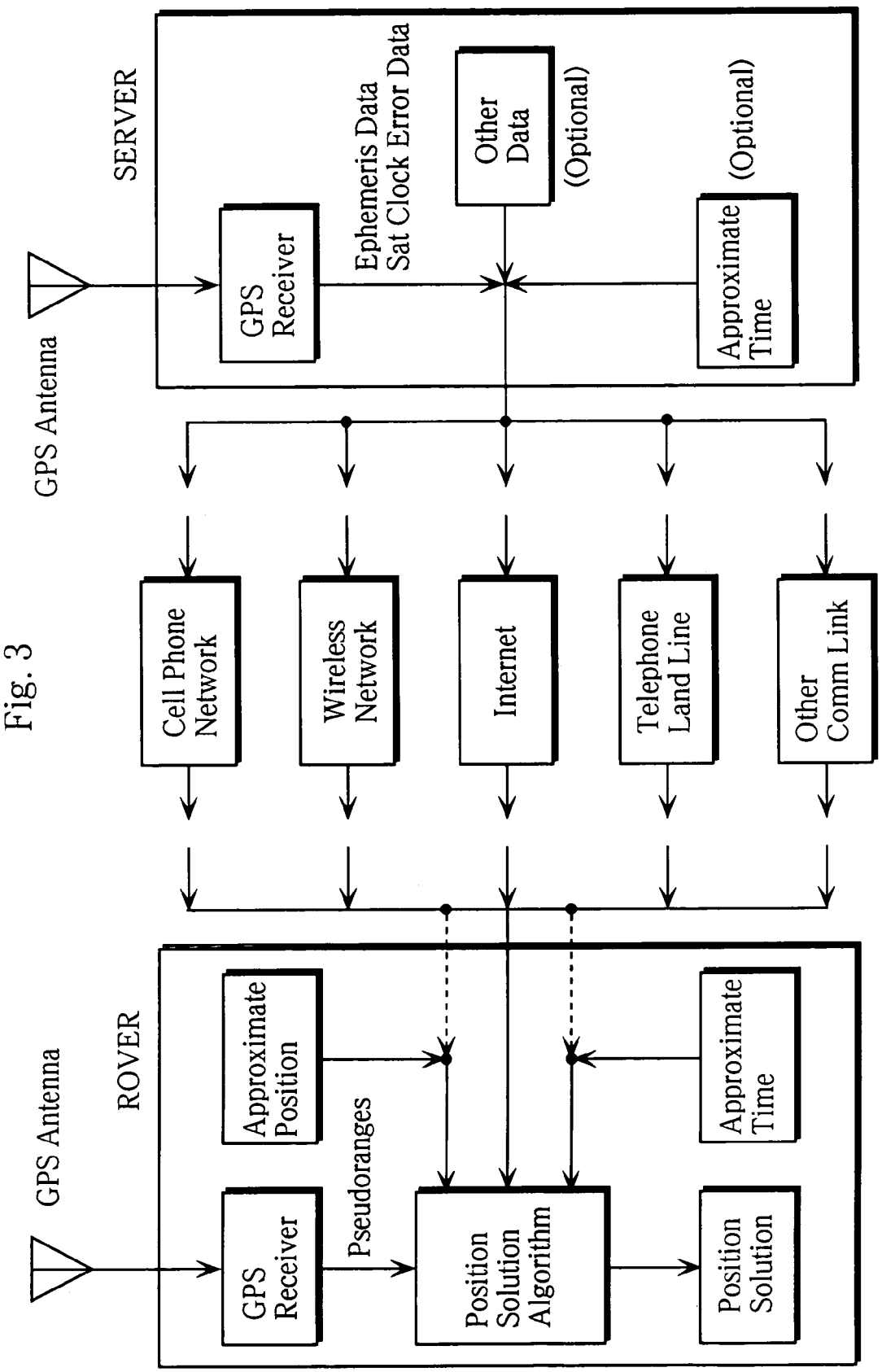
FIG. 3 is a block diagram serving as a functional explanatory view.

FIG. 3 is a block diagram showing pertinent features of the present invention. The only information required from the server is ephemeris data and satellite clock error corrections. Since these data are good for approximately two hours since the last update, they may be stored at the server and sent to the rover at a later time. The server may also send to the rover additional assisting data (such as Doppler measurements, etc.) and a timing signal, accurate to within approximately 10 seconds. However, the timing signal is not required since the rover can use its own low-cost real-time clock in initializing the position solution algorithm.

Because the present invention requires no form of time synchronization, a wide variety of server-to-rover communication links can be used, as shown in FIG. 2. If a cell phone network or certain wireless networks are used, they often can determine the approximate location of the rover used in initializing the position solution algorithm. In other cases the last known position of the rover can often be used successfully.

Dilution of Precision

Geometric Dilution of Precision (GDOP) for the present invention is calculated in a different manner compared to the conventional method, although the basic principle underlying the calculation is still the same. The basic components of GDOP for conventional unassisted positioning are Position Dilution of Precision (PDOP), Horizontal Dilution of Precision (HDOP), Vertical Dilution of Precision (VDOP), and receiver clock Bias Dilution of Precision (BDOP). The present invention retains PDOP, HDOP, and VDOP, but replaces BDOP with Time Dilution of Precision (TDOP). The numerical values of PDOP, HDOP, and VDOP will differ slightly from those obtained conventionally, but values of TDOP may vary significantly from BDOP, since the time T of pseudorange measurements and the clock bias B are distinctly different quantities.

To determine GDOP for the present invention, it is assumed that the quantities $c\tau_k$ have independent, zero mean, unit variance noise components $\delta_k$, where $\tau_k$ is expressed in milliseconds and c is the speed of light in meters per millisecond. It is seen from (7) that $\delta_k$ is also the noise component of $\rho_k$, so that from (8) the noise component of the pseudorange difference measurement $\rho_{1k}=\rho_1-\rho_k$ is therefore $\delta_1-\delta_k$. Thus, the noise component of the vector $\overline{d\rho}=[\rho_{12}\ \rho_{13}\ \ldots\ \rho_{1n}]^T$ of pseudorange difference measurements is the vector $\overline{\delta_{d\rho}}$ given by $$\overline{\delta_{d\rho}} = \begin{bmatrix} \delta_1 - \delta_2 \\ \delta_1 - \delta_3 \\ \vdots \\ \delta_1 - \delta_n \end{bmatrix} = \underbrace{\begin{bmatrix} 1 & -1 & 0 & 0 & \cdots & 0 \\ 1 & 0 & -1 & 0 & \cdots & 0 \\ \vdots & \vdots & \vdots & \vdots & & \vdots \\ 1 & 0 & 0 & 0 & \cdots & -1 \end{bmatrix}}_{D} \underbrace{\begin{bmatrix} \delta_1 \\ \delta_2 \\ \vdots \\ \delta_n \end{bmatrix}}_{\overline{\delta_p}} = D\overline{\delta_p} \quad (14)$$

From (13) it is seen that the noise vector $\overline{\delta_{d\rho}}$ for the pseudorange difference measurements will cause a corresponding zero-mean noise vector $\overline{\delta_x}$ for the solution vector $\overline{x}$, given by $$\overline{\delta_x} = (H^T H)^{-1} H^T \overline{\delta_{d\rho}}. \quad (15)$$

The covariance matrix C of $\overline{\delta_x}$ is $$C = E\{\overline{\delta_x}\overline{\delta_x}^T\} \quad (16)$$
$$= E\{(H^T H)^{-1} H^T \overline{\delta_{d\rho}} \overline{\delta_{d\rho}}^T H(H^T H)^{-T}\}$$
$$= E\{(H^T H)^{-1} H^T D\overline{\delta_p} \overline{\delta_p}^T D^T H(H^T H)^{-T}\}$$
$$= (H^T H)^{-1} H^T D \underbrace{E\{\overline{\delta_{d\rho}}\overline{\delta_{d\rho}}^T\}}_{I_{n \times n}} D^T H(H^T H)^{-T}$$
$$= (H^T H)^{-1} H^T DD^T H(H^T H)^{-T}$$

where $E\{\ \}$ denotes expectation, and we have used the fact that $$E\{\overline{\delta_{d\rho}}\overline{\delta_{d\rho}}^T\} = I_{n \times n},$$

the n by n identity matrix.

The diagonal elements $C_{11}$, $C_{22}$, $C_{33}$, and $C_{44}$ are the respective variances of the solutions for X, Y, Z, and T under the previous assumption of independent, unit variance pseudorange measurement noises, and are used to define PDOP, HDOP, VDOP, and TDOP as follows:

$$PDOP = \sqrt{C_{11}+C_{22}+C_{33}}$$

$$HDOP = \sqrt{C_{11}+C_{22}} \quad (17)$$

$$VDOP = \sqrt{C_{33}}$$

$$TDOP = \sqrt{C_{44}}$$

Typical Performance

The performance of the present invention has been simulated to obtain a proof of concept. The simulation uses a model of the GPS satellite constellation consisting of six orbital planes consisting of four satellites angularly equispaced in each orbit. The ascending nodes of the six orbits are angularly equispaced around the equator of the rotating Earth. The true positions of server and rover are at the same fixed point on the surface of the Earth. The results presented here assume the server and rover are at 34 degrees North latitude, and that the mask angle for visible satellites is 10 degrees. The pseudorange measurement noise is assumed to have a standard deviation of 1 meter. In each trial, the visible satellites are randomly determined by randomizing the time of day in a 24-hour period, and the positioning algorithm always uses 5 satellites randomly selected from the visible ones.

The results of 20,000 Monte Carlo trials are shown in Table 1. Since the root-mean-square (RMS) position and time errors are expected to increase with increasing PDOP, the results are grouped into four PDOP categories.

TABLE 1

| PDOP Category | RMS 3D Position Error (m) | RMS Error in Time T of Pseudorange Measurement (msec) | Number of Trials in PDOP Category |
|---|---|---|---|
| PDOP < 5 | 3.8 | 2.7 | 6332 |
| 5 ≤ PDOP < 10 | 7.1 | 5.2 | 6485 |
| 10 ≤ PDOP < 20 | 14.1 | 10.5 | 3404 |
| 20 ≤ PDOP < 40 | 27.7 | 22.1 | 1741 |

From Table 1 it can be seen that good 3-D positioning results can be obtained by this method, provided that at least 5 satellites with sufficiently good PDOP are visible by the rover. Significantly reduced errors are possible by using more than 5 satellites. Note that the RMS positioning error in the table is in good agreement with the corresponding PDOP category, since the RMS positioning error should equal PDOP for the 1 meter 1-sigma pseudorange measurement noises used in the simulation. If altitude aiding is available (i.e., a local altitude map stored in the rover), a minimum of only 4 satellites would be needed to obtain similar results.

It also should be noted that since the time T of pseudorange measurement can be determined at the rover to within a few milliseconds when the PDOP is favorable (i.e., small), this time can be used to calibrate the clock in the rover to the same level of accuracy. With 5 satellites the RMS error in this estimate ranges from 2.7 msec for PDOP<5 to 22.1 msec for 20≦PDOP<40.

An embodiment of the present invention is a process for accurate location determination in an assisted GPS positioning system requiring at a minimum the transmission of ephemeris, satellite clock correction data, and approximate position information, or equivalent data, from the server or other information source to the rover, including following steps.

(A1) using the signals from at least 5 satellites for 3-dimensional (3D) positioning or at least 4 satellites for 2-dimensional (2D) positioning, (B1) using pseudorange measurements in a system of equations having, as a minimum set of unknowns for 3D positioning the unknowns X, Y, Z, and T, where (X,Y,Z) is the 3D rover position in a predefined coordinate system, and T is the time at which simultaneous measurements are made to determine pseudoranges to all satellites, or (C1) using pseudorange measurements in a system of equations having, as a minimum set of unknowns for 2D positioning the unknowns X, Y, and T, where (X,Y) is the 2D horizontal rover position in a predefined coordinate system, and T is the time at which simultaneous measurements are made to determine pseudoranges to all satellites, (D1) where in said system of equations the position of each satellite is a vector-valued function $f_k(T)$ of said time T, where $f_k$ is determined from satellite ephemeris data or its equivalent, sent to the rover over a communication link, as well as from knowledge of the approximate position of the rover.

In the present invention, a communication link is used for communication between the server or other information source and the rover, and said communication link is any one, or a combination of communication means including, cellular telephone networks, wired or wireless internet access, or telephone land lines.

And, the present invention includes further the determination of accurate but ambiguous pseudorange differences by using the knowledge that the epochs of the GPS C/A pseudorandom code are transmitted at integer millisecond values of space vehicle (SV) time, which are corrected to GPS time using said satellite clock correction data.

And, the present invention includes further the resolution of ambiguity in the said pseudorange differences by using said knowledge of the approximate position of the rover, provided to the rover by the server or other source.

And, in the present invention, a least-squares interactive algorithm used for solving the solution of said system of equations starts with an initial solution estimate $\bar{x}=[X\ Y\ Z\ T]^T$, and each subsequent pass through the algorithm starts with the previous solution estimate, said algorithm consisting of the following steps, the sequence of steps being repeated until convergence of the solution is obtained:

(A5) Use the ephemeris data, or its equivalent, received from the server to calculate the satellite positions $(x_k, Y_k, z_k)$ at time T.

(B5) Compute the LOS vectors $\bar{r}_k$ and their lengths (ranges) $r_k$ from the rover position estimate (X, Y, Z) to each satellite.

(C5) Compute the times of signal transmission $t_k=T-r_k/c$ for the satellites, where c is the speed of light.

(D5) Use the ephemeris data to recompute the satellite positions $(x_k, y_k, z_k)$, the $\bar{r}_k$ and $r_k$, and the corresponding satellite velocity vectors $\bar{v}_k$, using the times $t_k$ of signal transmission for each satellite that were obtained in Step C5

(E5) Calculate the rover-to-satellite unit vectors $$\bar{u}_k = \begin{bmatrix} \frac{\partial r_k}{\partial X} & \frac{\partial r_k}{\partial Y} & \frac{\partial r_k}{\partial Z} \end{bmatrix}$$

along the LOS vectors $\bar{r}_k$.

(F5) Form the matrix H defined by $$H = \begin{bmatrix} \frac{\partial \rho_{12}}{\partial X} & \frac{\partial \rho_{12}}{\partial Y} & \frac{\partial \rho_{12}}{\partial Z} & \frac{\partial \rho_{12}}{\partial T} \\ \frac{\partial \rho_{13}}{\partial X} & \frac{\partial \rho_{13}}{\partial Y} & \frac{\partial \rho_{13}}{\partial Z} & \frac{\partial \rho_{13}}{\partial T} \\ \vdots & \vdots & \vdots & \vdots \\ \frac{\partial \rho_{1n}}{\partial X} & \frac{\partial \rho_{1n}}{\partial Y} & \frac{\partial \rho_{1n}}{\partial Z} & \frac{\partial \rho_{1n}}{\partial T} \end{bmatrix} = \begin{bmatrix} \bar{u}_2 - \bar{u}_1 & \bar{u}_1 \Box \bar{v}_1 - \bar{u}_2 \Box \bar{v}_2 \\ \bar{u}_3 - \bar{u}_1 & \bar{u}_1 \Box \bar{v}_1 - \bar{u}_3 \Box \bar{v}_3 \\ \vdots & \vdots \\ \bar{u}_n - \bar{u}_1 & \bar{u}_1 \Box \bar{v}_1 - \bar{u}_n \Box \bar{v}_n \end{bmatrix}$$

where the vectors $\bar{v}_k$ are the satellite velocity vectors.

(G5) Using the $r_k$ previously obtained in Step D5, calculate the vector $\overline{dr}=[r_1-r_2\ r_1-r_3\ \ldots\ r_1-r_n]^T$ of range differences that would result using the current solution estimate $\bar{x}$.

(H5) Calculate the vector $\Delta\overline{d\rho}=\overline{d\rho}-\overline{dr}$ of change between the measured pseudorange differences provided by the receiver and the calculated range differences from Step G5, where $\overline{d\rho}=[\rho_{12}\ \rho_{13}\ \ldots\ \rho_{1n}]^T$, the $\rho_{1k}$ are calculated as $$\rho_{1k}=c(n_k-n_1)+c(\epsilon_k-\epsilon_1)+c(\tau_k-\tau_1),$$

$\tau_k$ is the measurement of received code phase for the $k^{th}$ satellite, $\epsilon_k$ is the satellite clock correction for the $k^{th}$ satellite as received from the server, and the unknown integers $n_k-n_1$ are resolved according to the calculation $$n_k - n_1 = c\,\text{int}\left[\frac{r_1 - r_k}{c} - (X_k - X_1) - (\epsilon_k - \epsilon_1)\right].$$

(I5) Calculate the correction $\Delta\bar{x}=(H^T H)^{-1}H\Delta\overline{d\rho}$ to be applied to the current solution estimate.

(J5) Generate a new solution estimate $\bar{x}=\bar{x}+\Delta\bar{x}$, where the equals sign symbolizes an arithmetic assignment statement, not an algebraic equality.

(K5) If not enough iterations have been performed to get good convergence, go to Step A5; otherwise exit the iterative process with the solution $\bar{x}$.

And, in a further embodiment of the present invention, the steps of said iterative algorithm are the same, except that the quantities are suitably modified for the purpose of 2D positioning.

Although the embodiment of the present invention uses GPS satellites, the method can also be used with other global navigation satellite systems (GNSS) which use periodic pseudorandom codes and broadcast ephemeris data. Such systems include, but are not limited to, the European Galileo positioning system.

What is claimed is:

1. A process for accurate location determination in an assisted GPS positioning system requiring at a minimum the transmission of data corresponding to ephemeris, satellite clock correction data, and approximate position information from an information source to the rover, the process comprising:

(A1) using the signals from at least 5 satellites for 3-dimensional (3D) positioning or at least 4 satellites for 2-dimensional (2D) positioning;

(B1) using pseudorange measurements in a system of equations having, as a minimum set of unknowns for 3D positioning the unknowns X, Y, Z, and T, where (X,Y,Z) is the 3D rover position in a predefined coordinate system, and T is the time at which simultaneous measurements are made to determine pseudoranges to all satellites; or (C1) using pseudorange measurements in a system of equations having, as a minimum set of unknowns for 2D positioning the unknowns X, Y, and T, where (X,Y) is the 2D horizontal rover position in a predefined coordinate system, and T is the time at which simultaneous measurements are made to determine pseudoranges to all satellites;

(D1) where in said system of equations the position of each satellite is a vector-valued function $f_k(T)$ of said time T, where $f_k$ is determined from data corresponding to satellite ephemeris data sent to the rover over a communication link, as well as from knowledge of the approximate position of the rover, further including a determination of accurate but ambiguous pseudorange differences by using the knowledge that the epochs of the GPS C/A pseudorandom code are transmitted at integer millisecond values of space vehicle (SV) time, which are corrected to GPS time using said satellite clock correction data.

2. The process as set forth in claim 1, in which a communication link is used for communication between the information source and the rover, and said communication link is any one, or a combination of communication means including, cellular telephone networks, wired or wireless internet access, or telephone land lines.

3. The process as set forth in claim 1, further including the resolution of ambiguity in the said pseudorange differences by using said knowledge of the approximate position of the rover, provided to the rover by the information source.

4. A process for accurate location determination in an assisted GPS positioning system requiring at a minimum the transmission of data corresponding to ephemeris, satellite clock correction data, and approximate position information from an information source to the rover, the process comprising:

(A1) using the signals from at least 5 satellites for 3-dimensional (3D) positioning or at least 4 satellites for 2-dimensional (2D) positioning:

(B1) using pseudorange measurements in a system of equations having, as a minimum set of unknowns for 3D positioning the unknowns X, Y, Z, and T, where (X,Y,Z) is the 3D rover position in a predefined coordinate system, and T is the time at which simultaneous measurements are made to determine pseudoranges to all satellites; or (C1) using pseudorange measurements in a system of equations having, as a minimum set of unknowns for 2D positioning the unknowns X, Y, and T, where (X,Y) is the 2D horizontal rover position in a predefined coordinate system, and T is the time at which simultaneous measurements are made to determine pseudoranges to all satellites;

(D1) where in said system of equations the position of each satellite is a vector-valued function $f_k(T)$ of said time T, where $f_k$ is determined from data corresponding to satellite ephemeris data sent to the rover over a communication link, as well as from knowledge of the approximate position of the rover, further including the resolution of ambiguity in the said pseudorange differences by using said knowledge of the approximate position of the rover, provided to the rover by the information source, wherein a least-squares interactive algorithm used for solving the solution of said system of equations starts with an initial solution estimate $\bar{x}=[X\ Y\ Z\ T]^T$, and each subsequent pass through the algorithm starts with the previous solution estimate, said algorithm consisting of the following steps, the sequence of steps being repeated until convergence of the solution is obtained:

(A5) Use the data corresponding to ephemeris data received from the information source to calculate the satellite positions $(x_k, y_k, z_k)$ at time T;

(B5) Compute the LOS vectors $\bar{r}_k$ and their lengths (ranges) $r_k$ from the rover position estimate (X, Y, Z) to each satellite;

(C5) Compute the times of signal transmission $t_k = T - r_k/c$ for the satellites, where c is the speed of light;

(D5) Use the ephemeris data to recompute the satellite positions $(x_k, y_k, z_k)$, the $\bar{r}_k$ and $r_k$, and the corresponding satellite velocity vectors $\bar{v}_k$, using the times $t_k$ of signal transmission for each satellite that were obtained in Step C5;

(E5) Calculate the rover-to-satellite unit vectors $$\bar{u}_k = \left[\frac{\partial r_k}{\partial X}\ \frac{\partial r_k}{\partial Y}\ \frac{\partial r_k}{\partial Z}\right]$$

along the LOS vectors $\bar{r}_k$;

(F5) Form the matrix H defined by $$H = \begin{bmatrix} \frac{\partial \rho_{12}}{\partial X} & \frac{\partial \rho_{12}}{\partial Y} & \frac{\partial \rho_{12}}{\partial Z} & \frac{\partial \rho_{12}}{\partial T} \\ \frac{\partial \rho_{13}}{\partial X} & \frac{\partial \rho_{13}}{\partial Y} & \frac{\partial \rho_{13}}{\partial Z} & \frac{\partial \rho_{13}}{\partial T} \\ \vdots & \vdots & \vdots & \vdots \\ \frac{\partial \rho_{1n}}{\partial X} & \frac{\partial \rho_{1n}}{\partial Y} & \frac{\partial \rho_{1n}}{\partial Z} & \frac{\partial \rho_{1n}}{\partial T} \end{bmatrix} = \begin{bmatrix} \bar{u}_2 - \bar{u}_1 & \bar{u}_1 \Box \bar{v}_1 - \bar{u}_2 \Box \bar{v}_2 \\ \bar{u}_3 - \bar{u}_1 & \bar{u}_1 \Box \bar{v}_1 - \bar{u}_3 \Box \bar{v}_3 \\ \vdots & \vdots \\ \bar{u}_n - \bar{u}_1 & \bar{u}_1 \Box \bar{v}_1 - \bar{u}_n \Box \bar{v}_n \end{bmatrix}$$

where the vectors $\bar{v}_k$ are the satellite velocity vectors;

(G5) Using the $r_k$ previously obtained in Step D5, calculate the vector $\overline{dr} = [r_1 - r_2\ r_1 - r_3\ \ldots\ r_1 - r_n]^T$ of range differences that would result using the current solution estimate $\bar{x}$;

(H5) Calculate the vector $\Delta\overline{d\rho} = \overline{d\rho} - \overline{dr}$ of change between the measured pseudorange differences provided by the receiver and the calculated range differences from Step G5, where $\overline{d\rho} = [\rho_{12}\ \rho_{13}\ \ldots\ \rho_{1n}]^T$ the $\rho_{1k}$ are calculated as $$\rho_{1k} = c(n_k - n_1) + c(\epsilon_k - \epsilon_1) + c(\tau_k - \tau_1),$$

$\tau_k$ is the measurement of received code phase for the $k^{th}$ satellite, $\epsilon_k$ is the satellite clock correction for the $k^{th}$ satellite as received from the server, and the unknown integers $n_k - n_1$ are resolved according to the calculation $$n_k - n_1 = \operatorname{cint}\left[\frac{r_1 - r_k}{c} - (X_k - X_1) - (\varepsilon_k - \varepsilon_1)\right];$$

(I5) Calculate the correction $\Delta\bar{x} = (H^T H)^{-1} H\ \Delta\overline{d\rho}$ to be applied to the current solution estimate;

(J5) Generate a new solution estimate $\bar{x}=\bar{x}-+\Delta\bar{x}$, where the equals sign symbolizes an arithmetic assignment statement, not an algebraic equality;

(K5) If not enough iterations have been performed to get good convergence, go to Step A5; otherwise exit the iterative process with the solution $\bar{x}$.

5. The process as set forth in claim 4, in which the steps of said iterative algorithm are the same, except that the quantities are suitably modified for the purpose of 2D positioning.

\* \* \* \* \*